May 24, 1927.

W. C. ANTHONY ET AL

STEERING GEAR

Filed June 27, 1925

1,630,046

Inventors
William C. Anthony
William B. Mackintosh
by Parker + Carter
Attorneys.

Patented May 24, 1927.

1,630,046

UNITED STATES PATENT OFFICE.

WILLIAM C. ANTHONY AND WILLIAM B. MACKINTOSH, OF STREATOR, ILLINOIS, ASSIGNORS TO ANTHONY COMPANY, OF STREATOR, ILLINOIS, A CORPORATION OF ILLINOIS.

STEERING GEAR.

Application filed June 27, 1925. Serial No. 39,878.

This invention relates to a steering gear for automotive vehicles and especially to a reduction steering gear. It has for one object to provide a removable means whereby the reduction arrangement can be put in place in the steering gear of a tractor which has already been built. Other objects will appear from time to time throughout the specification and claims.

Our invention is illustrated more or less diagrammatically in the accompanying drawing, wherein.

Like parts are indicated by like characters throughout.

Figure 1:
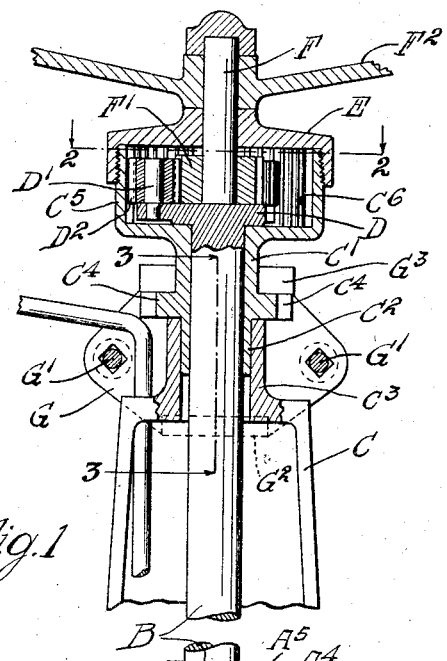
Figure 1 is a cross section through the steering gear with parts broken away and parts in section.
Figure 2:
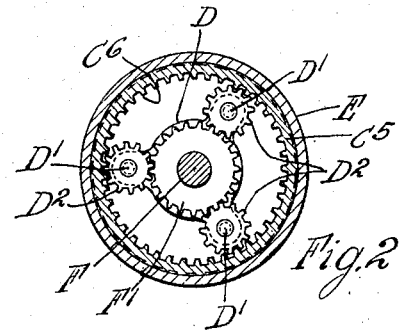
Figure 2 is a section taken on line 2—2 of Figure 1.
Figure 3:
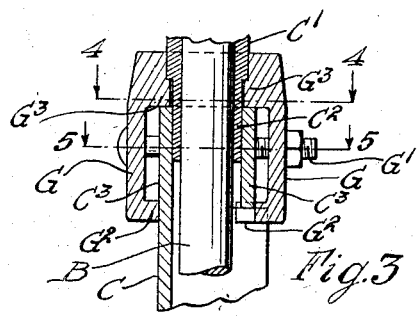
Figure 3 is an axial cross section taken on line 3—3 of Figure 1.
Figure 4:
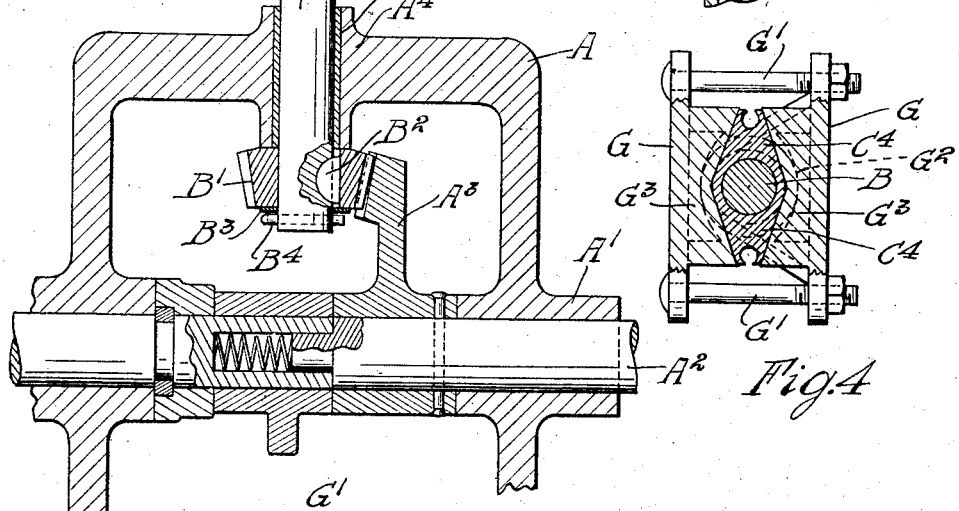
Figure 4 is a transverse cross section on line 4—4 of Figure 3.
Figure 5:
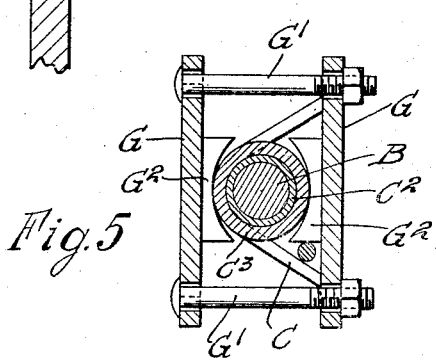
Figure 5 is a transverse section taken on line 5—5 of Figure 3.

A is a portion of the frame of an engine or tractor, carrying in one side the bearing $A^1$ in which a steering shaft $A^2$ is positioned. This shaft has positioned upon it a quadrant $A^3$. At its outer end the shaft $A^2$ carries the steering gear connection by means of which the wheels are steered. This is not shown as it forms no part of the present invention. Centrally the member A carries a bearing portion $A^4$ within which is mounted a bushing $A^5$.

The steering shaft B is journaled in the bushing and carries at its lower end a bevelled pinion $B^1$ which engages the quadrant $A^3$, the pinion being keyed upon the shaft by means of a key $B^2$. $B^3$ is a washer about the shaft B below the pinion $B^1$ held in place by the pin $B^4$.

C is a steering column housing within which a tubular member $C^1$ is positioned. This member is provided with a reduced portion $C^2$ and it is that portion which extends into the reduced upper neck $C^3$ of the housing C. The member $C^1$ is provided with laterally extending lugs $C^4$ $C^4$. At its upper end it is enlarged and provided with a bowl-like portion $C^5$ within which are cut gear teeth $C^6$.

The shaft B carries at its upper end a lateral enlargement or extension D in which are positioned stub shafts $D^1$ and a plurality of pinions $D^2$.

E is a cap enclosing the upper end of the bowl-portion $C^5$. It is centrally perforated and through the central perforation a short shaft F extends downwardly. This shaft is provided with a pinion $F^1$ which engages the pinions $D^2$. To the shaft F is fixed the steering wheel $F^2$.

The member $C^1$ is held against rotation by means of a clamp which will now be described. This clamp is made up primarily of two members G G which are held together by bolts $G^1$. Each of the members G is provided adjacent its lower end with an inward extension $G^2$ having a generally rounded face adapted to engage the upper restricted portion $C^3$ of the housing C. Adjacent its upper end of each of the members G is an extension $G^3$ which has an angular inner face corresponding in shape to the lugs $C^4$ and engaging them. The clamp arrangement thus engages the angular face of the housing C and engages between its upper inner extensions, the lugs $C^4$ and at its upper end engages the rounded part of the member $C^1$, thus preventing relative rotation of the parts.

Although we have shown an operative device, still it will be obvious that many changes might be made in size, shape, and arrangement of parts without departing materially from the spirit of our invention; and we wish, therefore, that our showing be taken as in a sense diagrammatic.

The use and operation of our invention are as follows:

The steering gear shown is intended primarily as a replacement for steering gears commonly supplied with a well-known make of tractor. As supplied these tractors do not have a reducing steering gear. It is essential to the purpose of this invention to provide a reducing steering gear which may be readily applied to such a tractor. For this purpose the steering shaft normally found in the steering column of the tractor is removed. A bushing, such as the bushing $A^5$ is put in the lower bearing. The member $C^1$ with its bowl-shaped upper enlargement is put in place at the top of the housing C and a shaft somewhat smaller than the shaft normally supplied with the tractor is put in place in the bearing. This is the shaft B. A planetary gear arrangement is located in the bowl-shaped enlargement at the top of the steering column. The parts are then tightened in position and held against relative movement and rotation by means of the special clamp shown and described.

Thus there is provided on the tractor in question, a reducing steering gear which may be readily and easily installed with a minimum of re-building and readjustment.

We claim:

1. In combination with a steering column having a casing other than circular in cross section a steering gear adapter a reduction means including a shaft, and an adapter for such shaft including a generally tubular portion, a cup-shaped enlargement having gear teeth on its interior, planetary gearing mounted partially on said shaft and located within said cup-shaped enlargement and a clamp provided with portions corresponding in shape to the steering column and such tubular adapter, and adapted to engage the two to prevent relative movement.

2. In combination with a steering column having a casing other than circular in cross section a steering gear adapter a reduction means including a shaft, and an adapter for such shaft including a generally tubular portion, a cup-shaped enlargement having gear teeth on its interior, planetary gearing mounted partially on said shaft and located within said cup-shaped enlargement and a two part clamp provided with portions corresponding in shape to the steering column and such tubular adapter, and adapted to engage the two to prevent their relative movement.

3. In combination with a steering column having a casing other than circular in cross section a steering gear adapter a reduction means including a shaft, and an adapter for such shaft including a generally tubular portion having laterally extending lugs, a cup-shaped enlargement having gear teeth on its interior, planetary gearing mounted partially on said shaft and located within said cup-shaped enlargement and a clamp provided with portions corresponding in shape to the steering column and such tubular adapter, and adapted to engage the two to prevent their relative movement.

4. In combination with a steering column having a casing other than circular in cross section a steering gear adapter a reduction means including a shaft, and an adapter for such shaft including a generally tubular portion having laterally extending lugs, a cup-shaped enlargement having gear teeth on its interior, planetary gearing mounted partially on said shaft and located within said cup-shaped enlargement and a two part clamp provided with portions corresponding in shape to the steering column, and such tubular adapter, and adapted to engage the two to prevent their relative movement.

5. In combination with a steering column having a casing other than circular in cross section a steering gear adapter a reduction means including a shaft, adapted to be substituted for an already existing shaft, being of somewhat reduced diameter with relation thereto, and an adapter for such shaft including a generally tubular portion, a cup-shaped enlargement having gear teeth on its interior, planetary gearing mounted partially on said shaft and located within said cup-shaped enlargement and a clamp provided with portions corresponding in shape to the already existing steering column and such tubular adapter, and adapted to engage the two to prevent their relative movement.

6. In combination with a steering column having a casing other than circular in cross section a steering gear adapter a reduction means including a shaft, adapted to be substituted for an already existing shaft, being of somewhat reduced diameter with relation thereto, and an adapter for such shaft including a generally tubular portion having laterally extending lugs, a cup-shaped enlargement having gear teeth on its interior, planetary gearing mounted partially on said shaft and located within said cup-shaped enlargement and a two part clamp provided with portions corresponding in shape to the already existing steering column and such tubular adapter, and adapted to engage the two to prevent their relative movement.

Signed at Streator, county of La Salle, and State of Illinois, this 23 day of June, 1925.

WILLIAM C. ANTHONY.
WILLIAM B. MACKINTOSH.